United States Patent
Conway

(10) Patent No.: US 9,792,210 B2
(45) Date of Patent: Oct. 17, 2017

(54) REGION PROBE FILTER FOR DISTRIBUTED MEMORY SYSTEM

(71) Applicant: Advanced Micro Devices, Inc., Sunnyvale, CA (US)

(72) Inventor: Patrick N. Conway, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 7 days.

(21) Appl. No.: 14/978,476

(22) Filed: Dec. 22, 2015

(65) Prior Publication Data
US 2017/0177484 A1 Jun. 22, 2017

(51) Int. Cl.
*G06F 12/08* (2016.01)
*G06F 12/0815* (2016.01)
*G06F 12/0813* (2016.01)

(52) U.S. Cl.
CPC ...... *G06F 12/0815* (2013.01); *G06F 12/0813* (2013.01); *G06F 2212/154* (2013.01); *G06F 2212/621* (2013.01)

(58) Field of Classification Search
CPC ............. G06F 12/0815; G06F 12/0813; G06F 2212/154
USPC ................. 711/146, 119, 120, 141
See application file for complete search history.

(56) References Cited

U.S. PATENT DOCUMENTS

| | | | |
|---|---|---|---|
| 6,973,543 B1 | 12/2005 | Hughes | |
| 7,062,610 B2 | 6/2006 | Conway | |
| 7,155,572 B2 * | 12/2006 | Hughes | G06F 12/0835 710/27 |
| 7,249,224 B2 * | 7/2007 | Glasco | G06F 12/0813 711/141 |
| 7,373,466 B1 | 5/2008 | Conway | |
| 7,669,011 B2 * | 2/2010 | Conway | G06F 12/0815 711/124 |
| 8,447,934 B2 * | 5/2013 | Joshi | G06F 12/082 711/146 |
| 2005/0033924 A1 * | 2/2005 | Glasco | G06F 12/0813 711/119 |
| 2014/0222984 A1 * | 8/2014 | Varney | H04L 67/289 709/223 |

(Continued)

OTHER PUBLICATIONS

J. F. Cantin et al., "Coarse-Grain Coherence Tracking: RegionScout and Region Coherence Arrays," IEEE Micro, vol. 26, Issue 1, pp. 70-79, Jan. 2006.

*Primary Examiner* — Pierre-Michel Bataille
(74) *Attorney, Agent, or Firm* — Polansky & Associates, P.L.L.C.; Paul J. Polansky

(57) ABSTRACT

A probe filter determines whether to issue a probe to at least one other processing node in response to a memory access request, and includes a region probe filter directory, a line probe filter directory, and a controller. The region probe filter directory identifies regions of memory for which at least one cache line may be cached in a data processing system and a state of each region, wherein a size of each region corresponds to a plurality of cache lines. The line probe filter directory identifies cache lines cached in the data processing system and a state of each cache line. The controller accesses at least one of the region probe filter directory and the line probe filter directory in response to a memory access request to determine whether to issue the probe, and does not issue any probe in response to a read-only request.

20 Claims, 6 Drawing Sheets

(56) References Cited

U.S. PATENT DOCUMENTS

2016/0173356 A1* 6/2016 Jiang .................. H04L 45/026
                                                                                  370/400

* cited by examiner

REGION PROBE FILTER FOR DISTRIBUTED MEMORY SYSTEM

FIELD

This disclosure relates generally to data processing systems, and more specifically to coherent multi-processor data processing systems with distributed memory.

BACKGROUND

Computer systems use main memory that is typically formed with inexpensive and high density dynamic random access memory (DRAM) chips. However DRAM chips suffer from relatively long access times. To improve performance, data processors typically include at least one local, high-speed memory known as a cache.

In a multi-core data processor, each data processor core may have its own dedicated upper-level cache, while lower level caches are shared by data processor cores. For example a typical configuration includes two data processor cores each of which have their own dedicated L1 cache but share L2 and L3 caches.

In more advanced computing systems, each multi-core processor can itself be interconnected with one or more other multi-core processors using a high-speed data link to form a data processing fabric. Within this data processing fabric, individual multi-core processors are interconnected to each other and to their own local memory. All local memory together forms a memory space available to any of the processors. However since the memory is physically distributed, the memory access time seen by each processor depends on whether the memory is local or remote. Thus this architecture is known as a non-uniform memory access (NUMA) architecture.

In computer systems using the NUM architecture, special precautions must be taken to maintain coherency of data that may be used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

To maintain coherency, these systems use probes to communicate between various caches within the computer system. A "probe" is a message passed from a coherency point in the computer system to one or more caches in the computer system to determine if the caches have a copy of a block of data and optionally to indicate the state into which the cache should place the block of data. After a processing node receives a probe, it responds to the probe by taking appropriate action.

In one NUMA system architecture, each processing node maintains a directory of the system memory so it can determine which processing node owns the data and therefore where to find the data. For example, the directory may contain information indicating that various subsystems contain shared copies of a block of data. In response to a command for exclusive access to that block, invalidation probes may be conveyed to the sharing subsystems.

The bandwidth associated with the network that interconnects the processing nodes can quickly become a limiting factor in performance, particularly for systems that employ large numbers of processors or when a large number of probes are transmitted during a short period. In such systems, it is known to include a probe filter to reduce the bandwidth requirements by filtering out unnecessary probes. For example if a cache line is designated as read-only, then the memory controller associated with a requesting processor core does not need to send a probe to determine if another processing node that has a copy of the cache line has modified the data. However while the probe filter can reduce system traffic and access latency, it requires a large amount of storage space to maintain the state of all cache lines in the system. Moreover if the size of the memory that needs to be looked up is too large, the probe filter may add a clock cycle delay between an access request and the determination that no probe needs to be issued.

Figure 1:
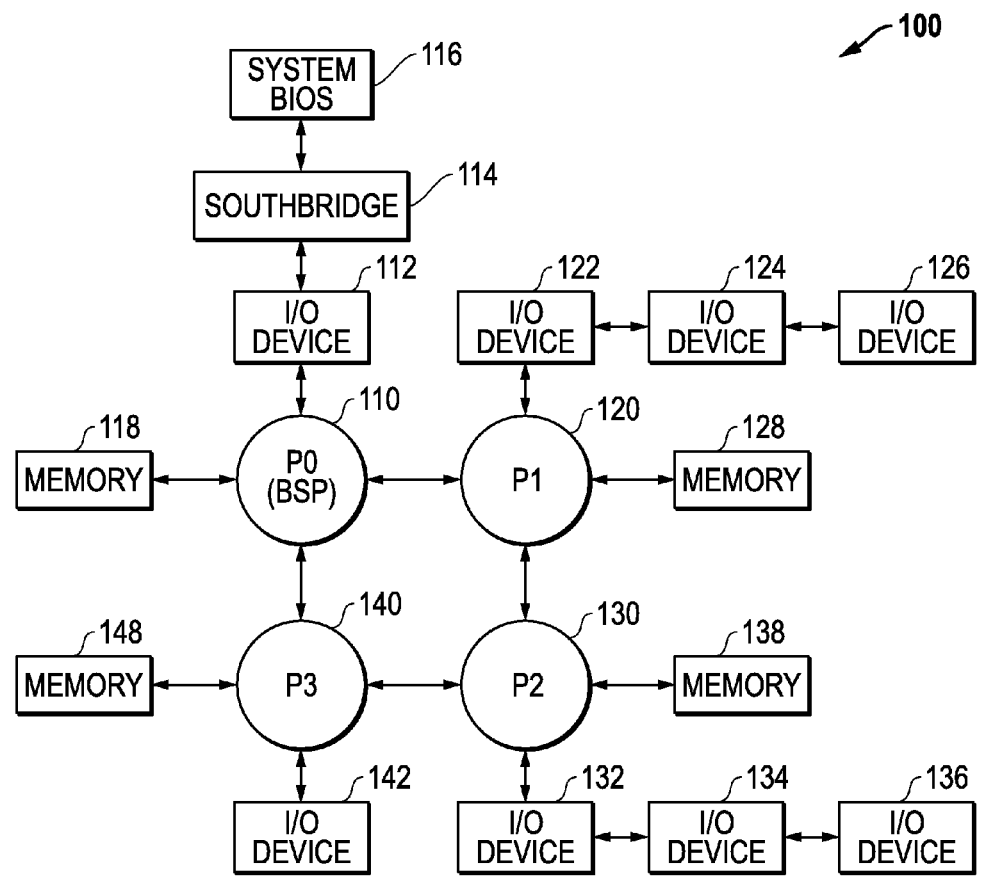
FIG. 1 illustrates in block diagram form a distributed data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below, a probe filter incorporates both a region probe filter directory and a line probe filter directory. The region probe filter directory stores attributes for whole regions of memory and corresponds to multiple cache lines. Since operating systems tend to allocate large pages that share a read-only attribute, the region probe filter directory can indicate this attribute for many cache lines and thus use space more efficiently.

In one form, a processing node for use in a distributed data processing system includes a memory accessing device having an associated cache and a probe filter coupled to the memory accessing device. The probe filter determines whether to issue a probe to at least one other processing node in response to a memory access request. The probe filter includes a region probe filter directory, a line probe filter directory, and a controller. The region probe filter directory identifies regions of memory for which at least one cache line may be cached in the data processing system and a state of each region, wherein a size of each region corresponds to a plurality of cache lines. The line probe filter directory identifies cache lines cached in the data processing system and a state of each cache line. The controller accesses the region and line probe filter directories in response to the memory access request to determine whether to issue any probe. The controller does not issue the probe in response to a read-only access request.

In another form, a probe filter for use in a data processing system includes a region probe filter directory, a line probe filter directory, and a controller. The region probe filter directory identifies regions of memory for which at least one cache line may be cached in the data processing system and a state of each region, wherein a size of each region corresponds to a plurality of cache lines. The line probe filter directory identifies cache lines cached in the data processing system and a state of each cache line. The controller accesses at least one of the region probe filter directory and the line probe filter directory in response to a read-only access request to determine whether to issue a probe. The controller does not issue any probe in response to a read-only access request.

In yet another form, a method can be used for filtering probe activity in a distributed data processing system. A read-only request is received at a processing node to a memory associated with the processing node. Whether an address of the read-only access request hits a region probe filter directory and a line probe filter directory is determined, wherein the line probe filter directory has a plurality of entries each corresponding to cache lines, and the region probe filter directory has a plurality of entries each corresponding to regions of memory wherein each region comprises a plurality of cache lines. If the address of the read-only request misses in both the region probe filter directory and the line probe filter directory, an entry for the region is created in the region probe filter directory. Data from the memory corresponding to the read-only access request is fetched without sending a probe to any other node in the distributed data processing system. The data is sent to a requesting processing node.

FIG. 1 illustrates in block diagram form a distributed data processing system 100 according to some embodiments. Distributed data processing system 100 includes a set of four processing nodes 110, 120, 130, and 140 labeled "P0", "P1", "P2", and "P3", respectively.

Each processing node is interconnected to two adjacent processing nodes by a bidirectional high-speed data link. For example processing node 110 is connected to processing nodes 120 and 140 by respective high-speed data links. Each of processing nodes 120, 130, and 140 is connected to two adjacent processing nodes using other respective high-speed data links.

As shown in FIG. 1, each processing node has three associated high-speed data links. Since data processing system 100 includes four processing nodes, each processing node uses two of the available links to connect to adjacent processing nodes, leaving one available high-speed data link that can be used for another purpose. For the example shown in FIG. 1, processing node 110 is connected to an input/output (I/O) device 112 using the remaining high-speed data link. I/O device 112 in turn is connected to a low-speed peripheral hub known as a "Southbridge" 114. Southbridge 114 in turn is connected to a basic input/output system (BIOS) memory 116 which acts as the BIOS for system 100, and since processing node 110 executes the BIOS it is known as the BIOS service processor (BSP). Processing node 120 is connected to an I/O device 122, which is connected to an I/O device 124, which is in turn connected to an I/O device 126. These I/O devices could be, for example, a peripheral component interconnect (PCI) express (PCIe) bus in which I/O device 122 is a PCIe root complex, I/O device 124 is a PCIe hub, and I/O device 126 is a PCIe endpoint device. Processing node 130 is connected in the same manner to an I/O device 132, which is connected to an I/O device 134, which is in turn connected to an I/O device 136. Processing node 140 is connected to a single I/O device 142.

Each processing node also has an associated memory. Thus processing node 110 has an associated memory 118, processing node 120 has an associated memory 128, processing node 130 has an associated memory 138, and processing node 140 has an associated memory 148. Each processing node connects to its respective memory using an integrated memory controller. Together, memories 118, 128, 138, and 148 form a unified system memory accessible to each processing node. Since it takes a longer amount of time for a processing node to access a remote memory than it does a local memory because of the need for the memory access requests to "hop" around the network, system 100 implements a NUMA architecture.

As will be described more fully below, each data processing node in system 100 uses a local probe filter to reduce the amount of network traffic. Moreover each data processor implements the probe filter in a space-efficient manner using both a region probe filter directory and a line probe filter directory.

Figure 2:
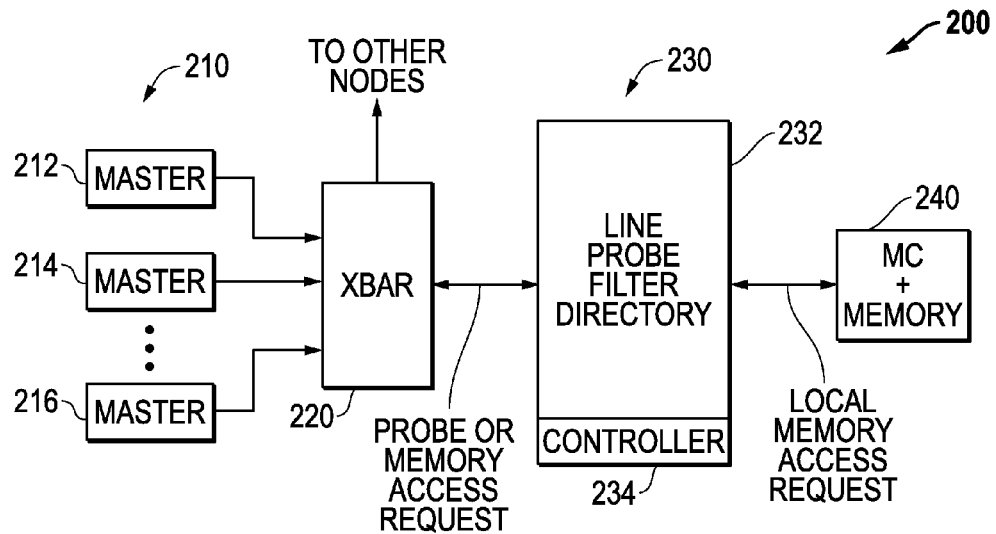
FIG. 2 illustrates in block diagram form a processing node having a probe filter according to the prior art.

FIG. 2 illustrates in block diagram form a processing node 200 having a probe filter 230 according to the prior art. Processing node 200 includes a set of memory accessing devices 210, a crossbar switch labeled "XBAR" 220, a probe filter 230, and a memory controller and memory 240. Memory accessing devices 210 include a certain number of data accessing devices, each labeled "MASTER", including representative memory accessing devices 212, 214, and 216 shown in FIG. 2. Each of memory accessing devices 212, 214, and 216 has an output for providing data access requests, and an input for receiving data, not shown in FIG. 2.

XBAR 220 is a crosspoint switch between memory accessing devices 210, other processing nodes in data processing system 100, and the memory system. Each connection is bidirectional, but some of them are shown as unidirectional to facilitate the description.

Probe filter 230 is connected between XBAR 220 and memory controller and memory 240. It has a first bidirectional port connected to XBAR 220 for issuing probes and receiving memory access requests, and a second bidirectional port connected to memory controller and memory 240 for providing local memory access requests and receiving responses and data from memory controller and memory 240. Probe filter 230 includes a line probe filter directory 232 and a controller 234 for issuing probes and receiving memory access requests from XBAR 220.

In operation, memory accessing devices 210 provide memory access requests and probe responses in response to executing programmed instructions. For example, memory accessing devices 212 and 214 could be CPU cores while memory accessing device 216 could be a graphics processing unit (GPU) core. In general, each memory accessing device has an L1 and an L2 cache arranged in a hierarchy. In addition, the CPU cores can share an L3 cache connected between memory accessing devices 210 and XBAR 220, not shown in FIG. 2. In this example, the L3 cache would appear to XBAR 220 as a single local master.

Probe filter 230 is effective in reducing the amount of probe traffic. It includes line probe filter directory 232 to store a copy of all the cache lines implemented in the data processing system as well as information about their status. Thus for example if another processing node allocated a line in memory 240, line probe filter directory 232 would keep track of the state and suppress the generation of a probe in certain circumstances. For example if line probe filter directory 232 indicated that the line was owned by another processing node but was marked as read-only, then on an attempted access by one of memory accessing devices 210, probe filter 230 would suppress the generation of a probe. On the other hand, if line probe filter directory 232 indicated that the line was owned by another processing node but was read/write, then processing node 200 would need to probe the owner node to make sure it contained the up-to-date copy of the cache line.

Since it requires a relatively large amount of storage space to maintain a listing of all the cache lines in the system, it is known to implement probe filter directory 232 by borrowing space in an existing cache on processing node 200. For example if processing node 200 includes a shared L3 cache between memory accessing devices 212 and 214 and XBAR 220, probe filter 232 can borrow some space from the L3 cache. However this borrowed space still adds to integrated circuit die size, because the L3 cache must be made larger to accommodate this alternate use.

In order to reduce the size of line probe filter directory 232, the inventor has discovered that many pages in typical data processing environments are read-only. Pages are units of memory that an operating system allocates for use by a program for a particular purpose. In a typical system a page corresponds to a memory region of 4 kilobytes (KB), 64 KB, 1 megabyte (MB), 2 MB, 16 MB, or 1 gigabyte (GB). All of the memory region typically has the same attributes, such as being read-only. A cache line, however, is typically only 64 B. By recognizing that operating systems mark attributes on a page basis and that many pages are read-only, the inventor has developed a probe filter directory with a smaller size.

Figure 3:
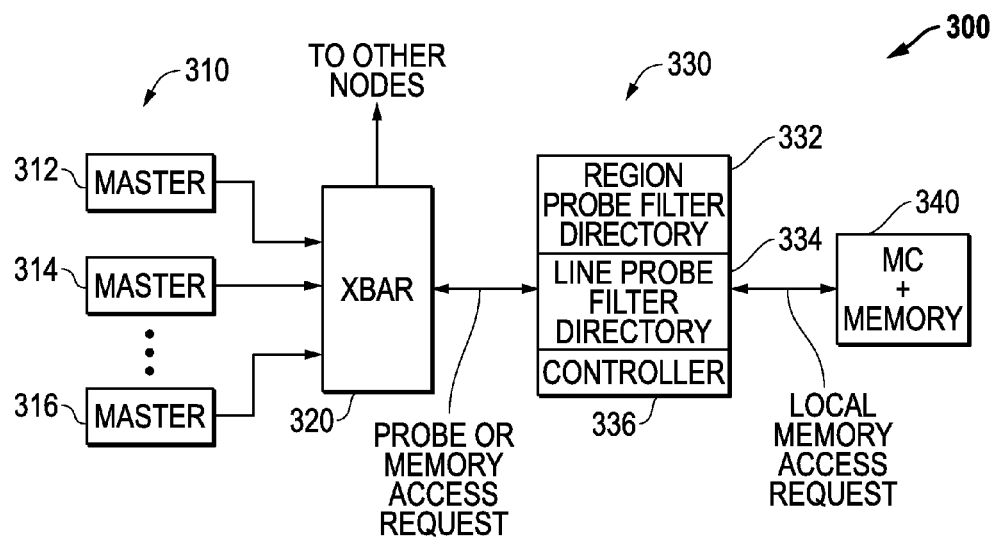
FIG. 3 illustrates in block diagram form a processing node having a probe filter according to some embodiments.

FIG. 3 illustrates in block diagram form a processing node 300 having a probe filter according to some embodiments. Processing node 300 includes a set of memory accessing devices 310, a crossbar switch (XBAR) 320, a probe filter 330, and a memory controller and memory 340. Memory accessing devices 310, XBAR 320, probe filter 330, and memory controller and memory 340 are interconnected as described for corresponding elements in FIG. 2 above. However, probe filter 330 differs from and is significantly smaller than probe filter 230 described with respect to FIG. 2 above.

In particular, probe filter 330 includes a region probe filter directory 332, a line probe filter directory 334, and a controller 336. Region probe filter directory 332 includes entries for whole regions of memory. Thus instead of requiring entries for all cache lines of memory 340 that are cached anywhere in the system, a single entry in region probe filter directory 332 can indicate, for example, a read-only status for the entire region instead of requiring entries for each cache line cached anywhere in the system. Further details of the operation of probe filter 330 will be described below.

Figure 4:
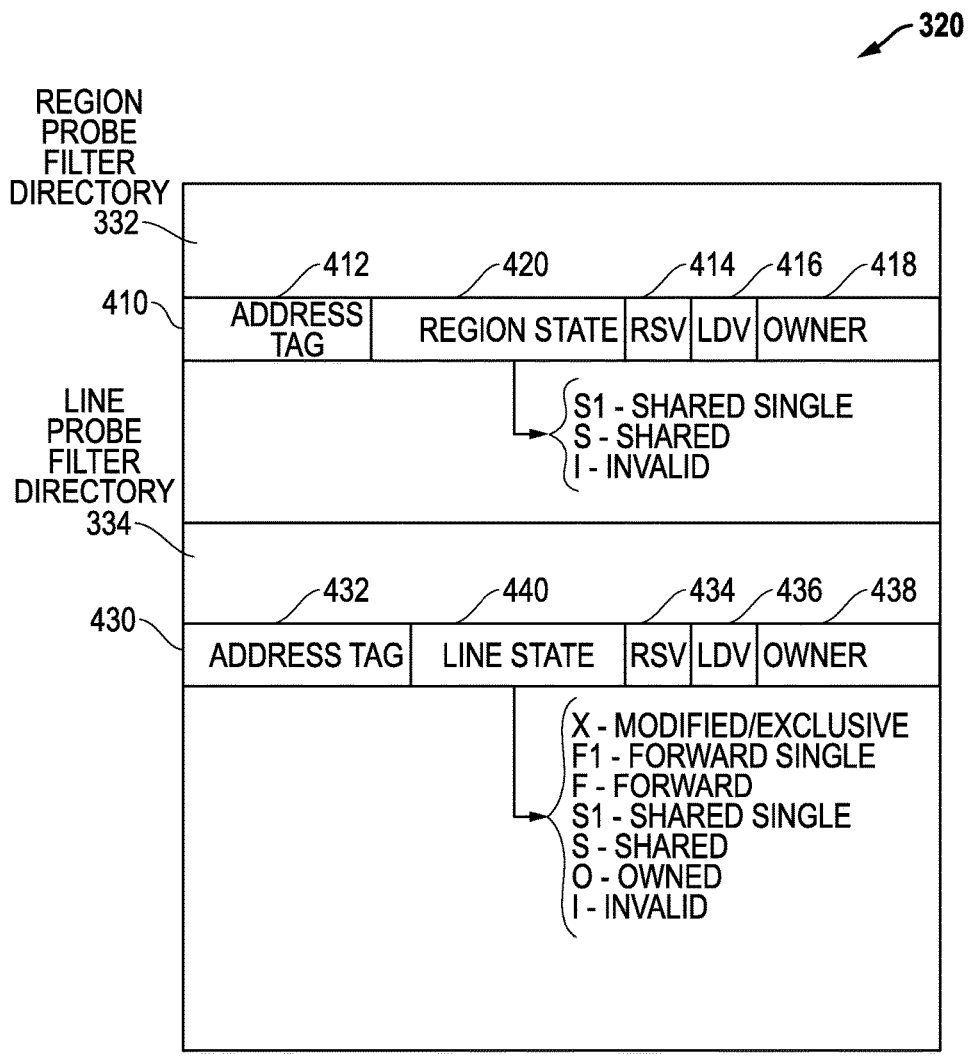
FIG. 4 illustrates in block diagram form a portion of the probe filter of FIG. 3 according to some embodiments.

FIG. 4 illustrates in block diagram form a portion of probe filter 330 of FIG. 3 according to some embodiments. In particular FIG. 3 shows additional details of region probe filter directory 332 and line probe filter directory 334.

Region probe filter directory 332 includes a set of entries including a representative entry 410. Entry 410 includes an ADDRESS TAG field 412, a remote socket valid (RSV) field 414, a local die valid (LDV) field 416, an OWNER field 418, and a REGION STATE field 420. ADDRESS TAG field 412 indicates the address of a page that corresponds to entry 410. For example if the page size is 1 MB in a system with 32-bit addresses, the ADDRESS TAG field could contain the most significant 12 bits of the address while the least significant 20 bits are don't cares. In another example, if the page size is 16 MB in a system with 48-bit addresses, then ADDRESS TAG field 412 could contain twenty-three bits to index into various entries. The RSV field 414 is a bit vector that indicates a number of a remote socket (i.e., processing node) may have a cached copy of at least one cache line in the region. The LDV field 416 is a bit vector that indicates that a number of nodes, e.g., systems on chip (SOCs), in the local socket may have a cached copy of at least one cache line in the region. The OWNER field 418 encodes the address of the processing node in the fabric that is the owner of the region or of the cache line in the region. The REGION STATE field 420 indicates the state of the region and it does not directly correspond to a cache line state or an attribute of the page in the page table. REGION STATE field 420 encodes three states, labeled "S1", "S", and "I". The I state indicates the entry is invalid. The S1 state indicates that the region is shared single in which the region is read only but has only been cached in a single node. The S state indicates that the region is shared and has been cached by more than a single node.

Line probe filter directory 324 also includes multiple entries including a representative entry 430. Entry 430 includes an ADDRESS TAG field 432, a remote socket valid (RSV) field 434, a local die valid (LDV) field 436, an OWNER field 438, and a LINE STATE field 440. ADDRESS TAG field 432 indicates the address of a cache line that corresponds to entry 430. For example if the cache line size is 64 B in a system with 32-bit addresses, then ADDRESS TAG field 432 could contain the most significant 26 bits of the address while the least significant 6 bits are don't cares. As above, RSV field 434 is a bit vector that indicates that a remote socket (i.e., processing node) may have a cached copy of the cache line, and LDV field 436 is a bit vector that indicates nodes on a local socket may have a cached copy of the cache line. LINE STATE field 440 indicates the state of the cache line. LINE STATE field 440 encodes seven states, labeled "X", F1" "F", S1, S, "O", and I. The I state indicates the entry is invalid. The X state indicates that the cache line is exclusive to the OWNER or that the cache line has been modified by the OWNER. The F1 state indicates that the cache line is clean and that there is a single copy in the system. The F state indicates that the cache line is clean and has been forwarded and that there are multiple copies in the system. The S1 state indicates that the cache line is shared but there is only a single copy in the system. The S state indicates that the cache line is shared and there are multiple copies in the system. The O bit indicates that the cache line is modified (dirty) by the owner and that there are multiple copies in the system.

Further details about the entries in region probe filter directory 332 and line probe filter directory 334 will be described below.

Figure 5:
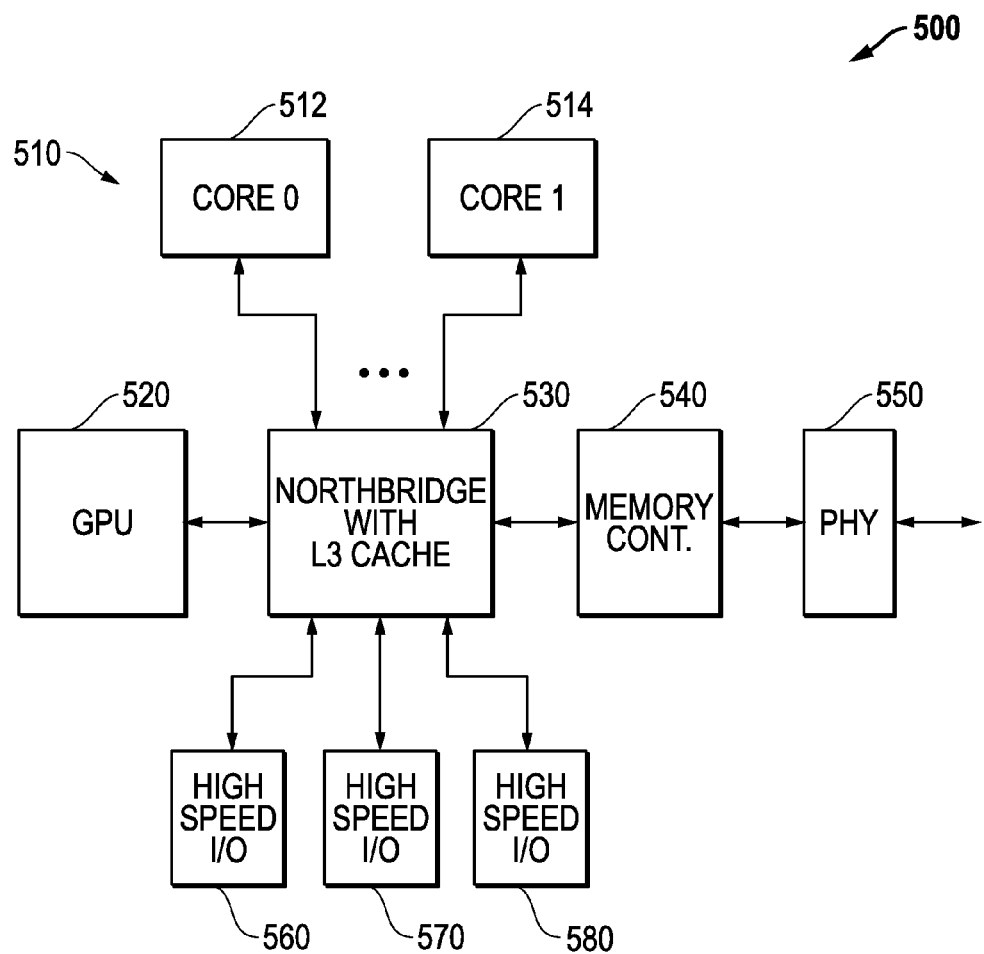
FIG. 5 illustrates in block diagram form a processing node for use in the distributed data processing system of FIG. 1 according to some embodiments.

FIG. 5 illustrates in block diagram form a processing node 500 for use in data processing system 100 of FIG. 1 according to some embodiments. Processing node 500 includes a set of central processing unit (CPU) cores 510, a GPU core 520, a "Northbridge" 530, a memory controller 540, a physical interface (PHY) 550 to a memory, and three high-speed I/O link controllers 560, 570, and 580. CPU cores 510 include a first CPU core 512 labeled "CORE 0", and a second CPU core 514 labeled "CORE 1". Each CPU core 512 and 514 has an internal cache hierarchy having L1 and L2 caches, whereas Northbridge 530 has an associated L3 cache that is shared between them. Note that CPU cores 512 and 514 may themselves be formed by multiple cores, such as two individual sub-cores each having an L1 cache but sharing an L2 cache. GPU core 520 has a dedicated bidirectional path to and from Northbridge 530. In addition to including the L3 cache for CPU cores 512 and 514, Northbridge 530 also includes various buffers and a crossbar switch for routing accesses between CPU cores 512 and 514 and GPU core 520, and memory controller 540 and high speed I/O link controllers 560, 570, and 580. As will be described further below, memory controller 540 also includes probe filter 330. Memory controller 540 efficiently manages memory command and overhead generation for the particular type of memory in the system, such as double data rate version four (DDR4) synchronous dynamic RAM. PHY 550 performs physical signaling, timing adjustment and calibration, and the like to connect memory controller 540 to external memory chips. High speed I/O link controllers 560, 570, and 580 are capable of managing high speed communication for I/O devices as well as other processing nodes for coherent system operation. In one example, high speed I/O link controllers 560, 570, and 580 operate according to the HyperTransport protocol defined by the HyperTransport Technology Consortium, but could implement other known protocols as well.

Figure 6:
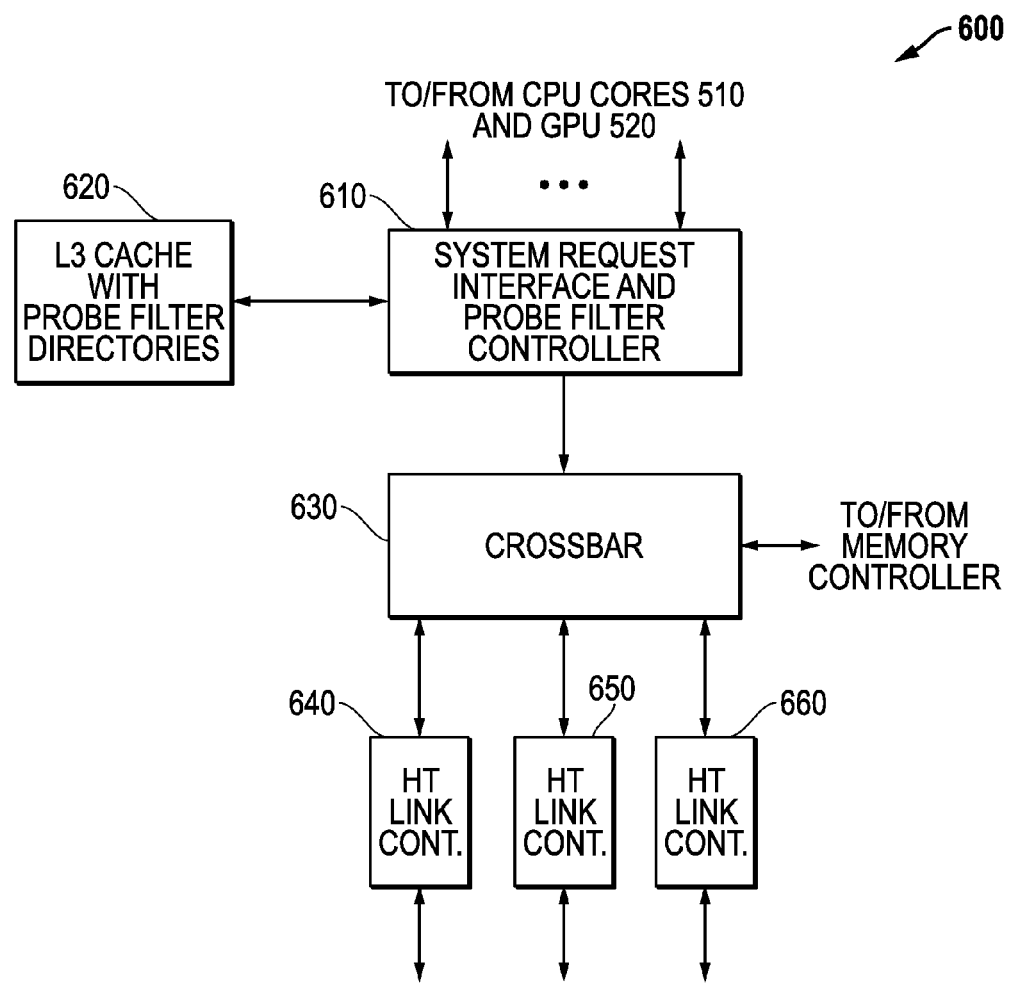
FIG. 6 illustrates in block diagram form a Northbridge that could be used to implement the Northbridge of FIG. 5 according to some embodiments.

FIG. 6 illustrates in block diagram form a Northbridge 600 that could be used to implement Northbridge 530 of FIG. 5 according to some embodiments. Northbridge 600 includes a system request interface and probe filter controller 610, an L3 cache 620, a crossbar switch labeled "CROSSBAR" 630, and HyperTransport (HT) link controllers 640, 650, and 660. System request interface and probe filter controller 610 has a set of bidirectional ports connected to corresponding ports of CPU cores 510 and GPU core 520. It not only performs necessary buffering, but also accesses the region and line probe filter directories that are stored in L3 cache 620. Memory access requests that do not access L3 cache 620 or that miss in L3 cache 620 result in the generation of memory access requests and/or probes to crossbar 630. Crossbar 630 then selectively routes the accesses to I/O devices or remote processing nodes using a selected one of HT link controllers 640, 650, or 660, or to memory through the memory controller.

Figure 7:
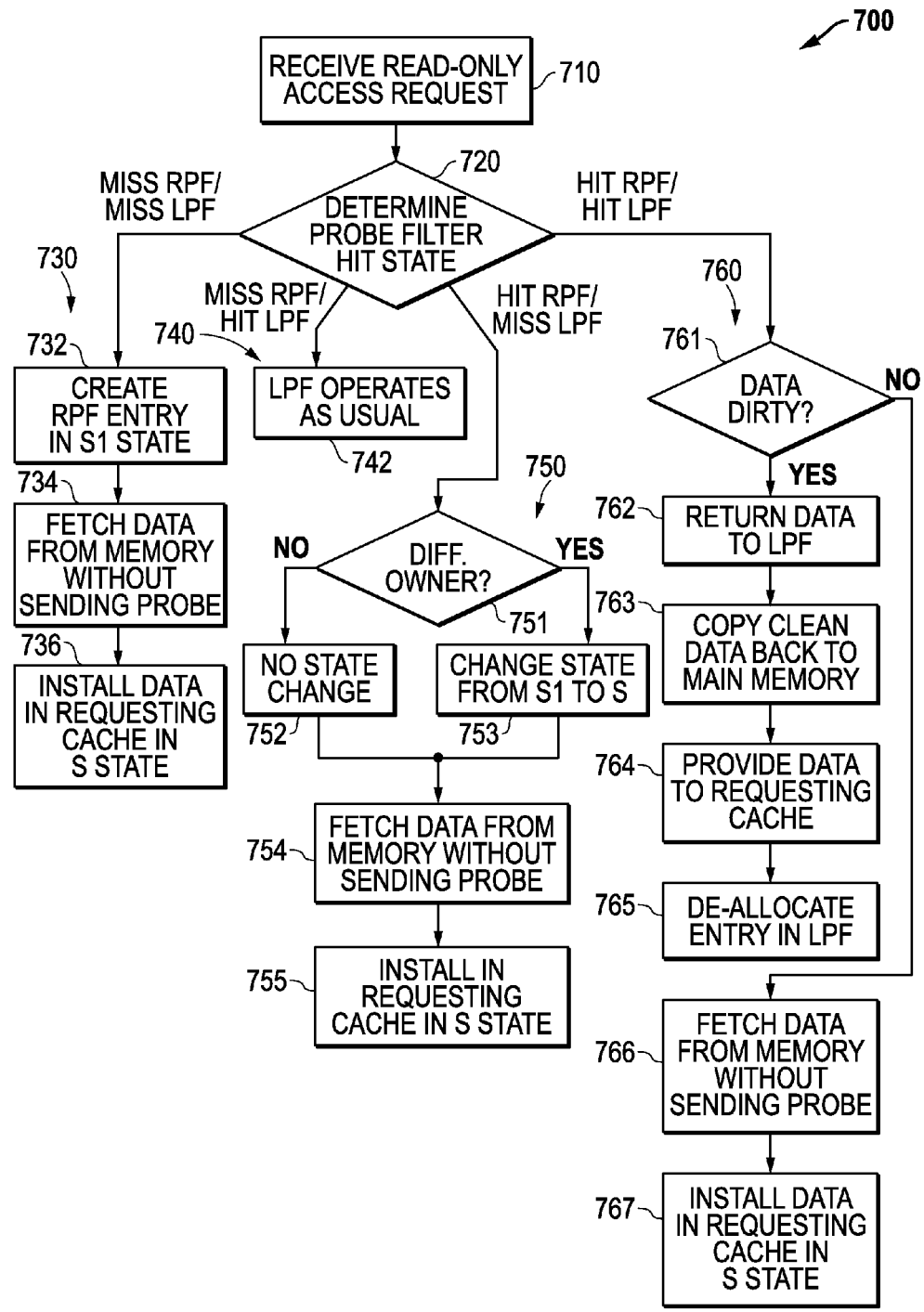
FIG. 7 illustrates a flow chart useful in understanding the operation of the probe filter of FIG. 3.

FIG. 7 illustrates a flow chart 700 useful in understanding the operation of probe filter 330 of FIG. 3. Flow begins in action box 710 in which probe filter 330 receives a read-only request. In response to receiving the read-only request, probe filter 330 accesses region probe filter directory 332 and line probe filter directory 334 to determine the overall hit state (box 720). If the read-only request misses in both region probe filter directory 332 and line probe filter directory 334, then the flow proceeds to sub-flow 730. In action box 732, controller 336 creates an entry in region probe filter directory 332 by setting REGION STATE field 420 to the shared single (S1) state and clearing the invalid (I) state. It records a portion of the address in ADDRESS TAG field 412, stores the node address of the requesting node in OWNER field 418, and uses the RSV and LDV fields to indicate the ownership state. In action box 734, probe filter 330 fetches data from memory by issuing a memory read request to the memory controller without sending a probe. Then when the data is returned from the memory in action box 736, it forwards the data through XBAR 320 to the requesting cache to be installed in the shared (S) cache line state. For example in the HyperTransport protocol, the data would be returned using a "RdResponse" packet.

If the read-only request misses in region probe filter directory 332 but hits in line probe filter directory 334 (box 720), then the flow proceeds to sub-flow 740. In action box 742, probe filter 330 operates as known line probe filters, issuing a probe if indicated by LINE STATE field 440. For example, if an address of an access matches the ADDRESS TAG field 432 of a valid entry, LINE STATE field 440 is in the X state, and the read request is from a different node than the OWNER, then probe filter 330 would issue an invalidating probe to cause the OWNER to update the memory and return a clean copy of the data, and change LINE STATE field 440 from X to S.

If the read-only request hits in region probe filter directory 332 but misses in line probe filter directory 334 (box 720), then the flow proceeds to sub-flow 750. First, controller 336 compares the requesting node to OWNER field 438 (box 751). If the requesting node is different from OWNER field 438, then in action box 753 controller 336 changes the state from S1 to S; otherwise in action box 752 controller 336 does not change the state. In action box 754, controller 336 fetches data from memory without sending a probe, and in action box 755 the system installs the line in the requesting cache in the S cache line state. Note that the presence of the entry in region probe filter directory 322 indicates that the region is a read-only region, and an additional read-only request does not change its state.

When region probe filter directory 332 hits for a read-only request, line probe filter directory 334 is expected to miss. However if the read-only request hits in both region probe filter directory 332 and line probe filter directory 334 (box 720), controller 336 recognizes a rare corner case, such as when a dirty page is flipped back into user space memory in a clean state following a swap. In this case the line probe filter directory entry takes precedence and the flow proceeds to sub-flow 760. In a decision box 761, controller 336 determines whether the data is dirty by checking the X bit in LINE STATE field 440. If the X bit is set, then in action box 762 the data is returned to probe filter 330, and in action box 763 the clean data is copied back to main memory. In action box 764 controller 336 provides the clean data through XBAR 320 to the requesting cache, and in action box 765 the entry is de-allocated from line probe filter directory 334 by placing the entry into the I state. If the X bit is not set, then in action box 766 the data is fetched from memory without sending a probe, and in action box 767 the clean data is installed in the requesting cache in the S cache line state.

When a caching agent receives an invalidating region probe, a hardware iterator in the caching agent invalidates each line in the region. When the hardware iterator finishes invalidating all lines in the region in the caching agent, then it returns a probe response to the region probe filter.

Thus a probe filter formed by a region probe filter and a line probe filter reduces the size required for their corresponding directories compared to a single line probe filter directory and thus saves integrated circuit area and cost.

Moreover this probe filter provides various other advantages. In many workloads it is very common for a CPU core to read a data line, install it in the exclusive (E) cache line state and later, when the line is cast out, send a clean victim notification to the probe filter to free up the probe filter entry. With reference to systems using the HyperTransport protocol, in these workloads a high proportion (for example, over 80%) of RdBlkL requests are later followed by a VicBlkCln. Similarly for lines which are read in a clean state (RdBlkC) and installed in the Forwarding (F) state, when they are eventually cast out, a clean victim notification (VicBlkCln) is sent to the probe filter to downgrade the probe filter entry to the invalid (I) state.

Probe filter 330 allows the caching agent to intelligently install the line in the S state when it is known that the operating system page is read-only and there is no advantage to installing it in the E state. Note that when lines in the S state are cast out from the caching agent, no notification is sent to the probe filter. This reduces the number of clean victims sent to the probe filter and reduces the volume of requests in the data fabric significantly.

The operating system maintains a Dirty bit to minimize the overhead of page swapping. Probe filter 330 provides a similarly effective mechanism, and the benefit increases with an increase in the number of read-only pages in the workload. Probe filter 330 is especially effective in so-called "Big Data" workloads like search, media streaming, object caching, web serving, and data analytics which rely on a large number of read-only pages.

Probe filter 330 also promotes probe filter "hygiene" and fights the buildup of "plaque" because a single region probe filter directory entry covers multiple cache lines. Here "plaque" refers to probe filter entries in the S state for which there is no corresponding line currently cached anywhere in the system, i.e., the line was cached but was silently replaced. Plaque can occur for both region probe filter directory entries as well as line probe filter directory entries. For example, if ten lines from the same region are cached in the S state and all ten are silently replaced, they would become ten lines of plaque in line probe filter directory 232. However in probe filter 330, the whole read-only region requires only one directory entry in region probe filter directory 332, and even if all cache lines are silently replaced, only one line of plaque in the region probe filter will remain.

A low overhead way to "floss" the probe filter and remove plaque is to have a "memory patrol" hardware daemon activate when a caching agent enters a low power state (such as the Advanced Configuration and Power Interface Specification "C1e" state), which requires that all caches in the caching agent be flushed. In this situation, the hardware daemon can simply invalidate all S1 entries whose OWNER is the caching agent in both region probe filter directory 332 and line probe filter directory 334 without issuing any invalidating probes.

Controller 336 may be implemented with various combinations of hardware and software. Some of the software components may be stored in a computer readable storage medium for execution by at least one processor. Moreover some or all of the method illustrated in FIG. 7 may also be governed by instructions that are stored in a computer readable storage medium and that are executed by at least one processor. Each of the operations shown in FIG. 7 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Processing node 300 of FIG. 3 or any portion thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the region and line probe filter directories may be implemented in various ways. As illustrated above, a portion of an existing L3 cache can be used to implement both of these directories, but in other embodiments the directories could be implemented with separate structures such as dual-port random access memories (RAMs). Moreover the region probe filter directory and line probe filter directory are logical concepts, and the entries can be intermingled in a single dual-port RAM or cache array by adding a common field to distinguish between the two formats. However it is preferred to be stored in a dual-ported structure to allow for parallel lookups for implementation of the flow of FIG. 7. But two serialized lookups are also possible. While the controller can be implemented in the Northbridge portion of the processing node, it can also be implemented in other parts of the processing node such as the memory controller. In other embodiments, the region probe filter directory and the line probe filter directory can indicate different or fewer line states than the line states described above.

Moreover an alternative to sending an invalidating region probe whenever a region probe filter entry is cast out is to send a non-invalidating region probe to each caching agent and have the caching agent probe response indicate which lines in the region it has cached in the S cache line state without invalidating any lines. In the probe response message the caching agent can return a presence vector with one bit for each line in the region (e.g., a 64-bit presence vector for a 4 kB region). The region probe filter can then combine the probe response vector from all caching agents by taking the logical OR of the presence vector from each probe response. The probe filter then allocates an individual entry in the line probe filter for each cached line in the region.

Accordingly, it is intended by the appended claims to cover all modifications of the disclosed embodiments that fall within the scope of the disclosed embodiments.

What is claimed is:

1. A probe filter for use in a data processing system comprising:
   a region probe filter directory for identifying regions of memory for which at least one cache line may be cached in the data processing system and a state of each region, wherein a size of each region corresponds to a plurality of cache lines;

a line probe filter directory for identifying cache lines cached in the data processing system and a state of each cache line; and a controller for accessing at least one of said region probe filter directory and said line probe filter directory in response to a memory access request to determine whether to issue a probe, wherein said controller does not issue any probe in response to a read-only access request.

2. The probe filter of claim 1 wherein said region probe filter directory comprises a plurality of entries, each entry of said region probe filter directory comprising:

an address tag field identifying an address of said region; and a region state field indentifying whether said region is read only.

3. The probe filter of claim 2 wherein said region state field of each entry indicates whether said entry:

is in a shared single state (S1) in which said region has only been accessed by only a single node;
is in a shared state (S) in which said region and has been accessed by another node besides said single node; and
is in an invalid state (I).

4. The probe filter of claim 1 wherein each entry said region probe filter directory further comprises:

an owner field indicating a node in said data processing system that owns the data.

5. The probe filter of claim 1 wherein said line probe filter directory comprises a plurality of entries, each entry comprising:

an address tag field identifying an address of said line;
a line state field indentifying whether said line is read only; and
an owner field indicating a node in said data processing system that owns the data.

6. A processing node for use in a distributed data processing system comprising:

a memory accessing device having an associated cache; and
a probe filter coupled to said memory accessing device for determining whether to issue a probe to at least one other processing node in response to a memory access request, comprising:

a region probe filter directory for identifying regions of memory for which at least one cache line may be cached in the data processing system and a state of each region, wherein a size of each region corresponds to a plurality of cache lines;
a line probe filter directory for identifying cache lines cached in the data processing system and a state of each cache line; and
a controller for accessing said region probe filter directory and said line probe filter directory in response to said memory access request to determine whether to issue said probe, wherein said controller does not issue said probe in response to a read-only access request.

7. The processing node of claim 6 wherein:

said controller further determines a probe filter hit state in response to accessing said region probe filter directory and said line probe filter directory.

8. The processing node of claim 7 wherein:

if said read-only access request misses in both said region probe filter directory and said line probe filter directory, said controller creates an entry in said region probe filter directory for a region containing an address of said read-only access request and sets said state of said region to a shared single state.

9. The processing node of claim 8 wherein said controller further fetches data from a memory associated with said processing node without issuing any probe, and installs said data in a requesting cache in a shared state.

10. The processing node of claim 8 wherein in response to a first subsequent read-only access request to said region in which said probe filter hit state indicates said read-only access request hits in said region probe filter directory but misses in said line probe filter directory:

said controller determines an owner of said first subsequent read-only access request; and
if said owner does not match an owner field of said entry in said region probe filter directory, said controller updates said state of said region from said shared single state to a shared state.

11. The processing node of claim 10 wherein in response to a second subsequent read-only request to said region in which said probe filter hit state indicates said read-only access request hits in said region probe filter directory but misses in said line probe filter directory:

said controller further fetches data from said memory without issuing any probe, and installs said data in a requesting cache in said shared state.

12. The processing node of claim 6 wherein in response to a subsequent read-only request to said region in which said probe filter hit state indicates said read-only access request hits in both said region probe filter directory and said line probe filter directory:

said controller determines whether said data is dirty; and
if said data is dirty, said controller determines further actions based on a corresponding entry in said line probe filter directory without reference to said region probe filter directory.

13. The processing node of claim 12 wherein said further actions comprise:

receiving clean data;
copying said clean data to memory;
providing said clean data to a requesting cache; and
de-allocating an entry for said line in said line probe filter directory.

14. A method for filtering probe activity in a distributed data processing system comprising:

receiving at a processing node a read-only access request to a memory associated with said processing node;
determining whether an address of said read-only access request hits a region probe filter directory and a line probe filter directory, wherein said line probe filter directory has a plurality of entries each corresponding to cache lines, and said region probe filter directory has a plurality of entries each corresponding to regions of memory wherein each region comprises a plurality of cache lines;
if said address of said read-only request misses in both said region probe filter directory and said line probe filter directory, creating an entry for said region in said region probe filter directory;
fetching data from said memory corresponding to said read-only access request without sending a probe to any other node in said distributed data processing system; and
sending said data to a requesting processing node.

15. The method of claim 14 wherein said creating said entry for said region in said region probe filter directory comprises:

setting a state of said entry to a shared single state.

16. The method of claim 15 wherein said sending said data to said requesting processing node comprises:
   installing said data in a cache associated with said requesting processing node in a shared state.

17. The method of claim 16 wherein said installing said data in said cache associated with said requesting processing node in said shared state comprises installing said data in said cache associated with said requesting processing node said shared single state.

18. The method of claim 16 wherein in response to a first subsequent read-only request to said region in which said probe filter hit state indicates said read-only access request hits in said region probe filter directory but misses in said line probe filter directory:
   determining an owner of said cache line; and
   if said owner does not match an owner field of said entry for said region in said region probe filter directory, updating said state of said region from said shared single state to said shared state.

19. The method of claim 18 wherein in response to a second subsequent read-only request to said region in which said probe filter hit state indicates said read-only access request hits in said region probe filter directory but misses in said line probe filter directory:
   further fetching data from said memory without issuing any probe; and
   installing said data in a requesting cache in said shared state.

20. The method of claim 16 wherein in response to a subsequent read-only request to said region in which said probe filter hit state indicates said read-only access request hits in both said region probe filter directory and said line probe filter directory:
   determining an action based on said entry in said line probe filter directory without reference to said region probe filter directory.

* * * * *